UNITED STATES PATENT OFFICE.

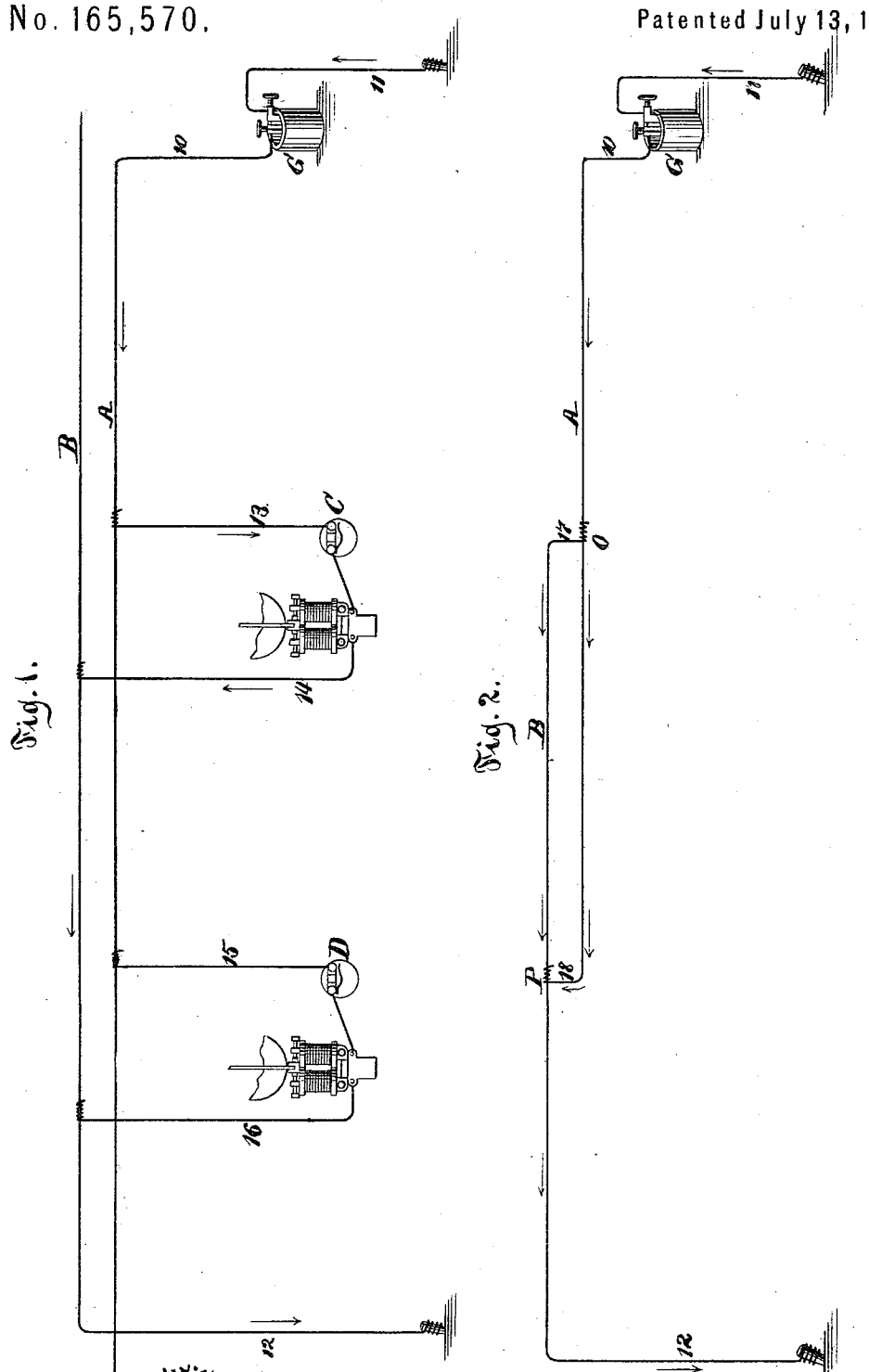

THOMAS S. HALL AND GEORGE H. SNOW, OF WEST MERIDEN, CONNECTICUT.

IMPROVEMENT IN CIRCUITS FOR ELECTRIC SIGNALS.

Specification forming part of Letters Patent No. 165,570, dated July 13, 1875; application filed June 23, 1875.

*To all whom it may concern:*

Be it known that we, THOMAS S. HALL and GEORGE H. SNOW, both of West Meriden, in the county of New Haven and State of Connecticut, have invented a new and useful Improvement in Operating Electric Signals, which improvement is fully set forth in the following specification, reference being had to the accompanying drawing, in which—

Figure 1 represents a diagram illustrating our circuit. Fig. 2 is a diagram of a modification of the same.

Similar letters indicate corresponding parts.

Our invention consists in combining two line-wires of a battery with the ground and with suitable keys or circuit-closers distributed along the line in such a manner that, whenever the circuit may be closed, the electric current will have to traverse the same distance, or, in other words, the resistance will be the same in every instance.

In the drawing, the letters A B designate two wires, which extend along the line of a railroad-track, or, in other words, form the line-wires of a telegraph-line. The wire A connects by a wire, 10, with one—say, the positive—pole of a galvanic battery, G, and the other pole of this battery connects by a wire, 11, with the ground. The battery G is supposed to be situated at one end of the line, and at the opposite end of said line the wire B is made to connect by a wire, 12, with the ground. Along the line are distributed a series of keys or circuit-closers, C D, each of which is connected with the line-wires A B, the connection of the circuit-closer C being effected by wires 13 and 14, and that of the circuit-closer D by wires 15 and 16. If the circuit is closed through the circuit-closer C, the current passes from the battery through wire 10, line-wire A, wire 13, circuit-closer C, wire 14, line-wire B, and wire 12 to the ground, and through the ground and wire 11 back to the battery. If the circuit is closed through the circuit-closer D, the current from the battery passes through wires 10, A, 15, circuit-closer D, wires 16, B, and 12 to the ground, and through the ground and wire 11 back to the battery.

From these two examples it will be seen that whenever the circuit is closed along the line the electric current has to traverse the whole circuit, and consequently the resistance is the same in all cases.

Our invention is intended particularly for operating electric railway-signals on an open circuit, and in this case it is of great importance that the resistance to the current shall be the same throughout the whole line, so that the force employed for moving the various signals will be the same in every case.

If our invention is applied to operating electric railroad-signals, it will frequently happen that two or more circuit-closers along the line are closed at the same time, and for this reason it is desirable to employ a battery of sufficient strength to operate the several signals. In Fig. 2 we have illustrated the effect of the battery, if two circuit-closers are closed at the same time. In this case the current will pass from the battery, through wire 10, to the line-wire A, and at the point O said current will divide, one portion passing through wire 17 to line-wire B, while the other portion follows the line-wire A and passes through wire 18 to the line-wire B, when both portions of the current unite again at the point P.

Referring to Fig. 1 of the drawing, if two circuit-closers, C D, are closed at the same time, the current from the battery will pass over line-wire A to the junction with the wire 13, where the same divides, one portion passing through wire 13, circuit-closer C, and wire 14 to line-wire B, while the other portion passes on the line-wire A to the junction with wire 15, and thence through wire 15, circuit-closer D, and wire 16 to line-wire B, where both portions of the current unite, passing through wire 12 to the ground, and through the ground and wire 11 back to the battery.

What we claim as new, and desire to secure by Letters Patent, is—

The combination, with a series of keys or circuit-closers, C D, of a battery and two line-wires, A B, one pole of the battery and one end of the line-wire B being grounded, while the other pole of the battery connects with the line-wire A, all constructed and operating substantially in the manner herein shown and described.

In testimony that we claim the foregoing, we have hereunto set our hands and seals this 15th day of June, 1875.

THOMAS S. HALL. [L. S.]
GEORGE H. SNOW. [L. S.]

Witnesses:
C. P. IVES,
E. I. WILLIAMS.